US008559730B2

(12) United States Patent
Cutzu et al.

(10) Patent No.: US 8,559,730 B2
(45) Date of Patent: Oct. 15, 2013

(54) METHOD FOR DETECTING PIXEL OUTLIERS

(75) Inventors: Florin Cutzu, San Jose, CA (US); Sumit Chawla, San Carlos, CA (US); Ted Cooper, Sunnyvale, CA (US); Robert A. Williams, Los Altos, CA (US)

(73) Assignee: Foveon, Inc., Santa Clara, CA (US)

( * ) Notice: Subject to any disclaimer, the term of this patent is extended or adjusted under 35 U.S.C. 154(b) by 621 days.

(21) Appl. No.: 12/882,819

(22) Filed: Sep. 15, 2010

(65) Prior Publication Data

US 2012/0063679 A1    Mar. 15, 2012

(51) Int. Cl.
*G06K 9/56* (2006.01)

(52) U.S. Cl.
USPC .......................................................... 382/205

(58) Field of Classification Search
USPC .................................. 382/165, 167; 348/241
See application file for complete search history.

(56) References Cited

U.S. PATENT DOCUMENTS

| | | | | |
|---|---|---|---|---|
| 6,728,401 | B1 * | 4/2004 | Hardeberg | 382/167 |
| 7,034,874 | B1 * | 4/2006 | Reinhart et al. | 348/246 |
| 2008/0069442 | A1 * | 3/2008 | Itoh | 382/167 |

OTHER PUBLICATIONS

Astola, Jaakko. et al., "Vector Median Filters," Proceedings of the IEEE, Apr. 1990, vol. 78, No. 4, pp. 678-689, IEEE, New York, NY.
Smolka, B. et al., "New Filtering Technique for the Impulsive Noise Reduction in Color Images," Mathematical Problems in Engineering 2004:1, 2004, pp. 79-91, Hindawi Publishing Corporation, Cairo, Egypt.
Eppstein, David et al., "On Nearest Neighbor Graphs," Discrete & Computational Geometry, 1997, vol. 17, No. 3, pp. 263-282; publication has date of Jan. 12, 2000 printed on the first page, 19 pages.
Fischler, Martin A. et al., "Random Sample Consensus: A Paradigm for Model Fitting with Applications to Image Analysis and Automated Cartography," Communications of the ACM, Jun. 1981, vol. 24, No. 6, pp. 381-395. Association for Computing Machinery, New York, NY.

* cited by examiner

*Primary Examiner* — Chan S Park
*Assistant Examiner* — Elisa Rice
(74) *Attorney, Agent, or Firm* — Lewis Roca Rothgerber LLP

(57) ABSTRACT

A method for identifying singleton outlier pixels in a selected color space in a digital image including a plurality of pixels, includes for each 3×3 patch of pixels in the image, calculating the diameter of the 3×3 patch of pixels. For each pixel in the patch, the distance to its nearest neighbor pixel within the patch is computed, as measured in the selected color space. The computed distance from each pixel in the patch is compared to its nearest neighbor with a threshold that is a preselected fraction of the diameter. A center pixel in the patch is identified as an outlier pixel if its calculated distance to its nearest neighbor is the largest distance to a nearest neighbor and exceeds the threshold.

8 Claims, 3 Drawing Sheets

METHOD FOR DETECTING PIXEL OUTLIERS

BACKGROUND

Field of the Invention

The present invention relates to digital image processing. More particularly, the present invention relates to methods for detecting pixel outliers in images.

The open scientific literature relevant to the problem of hot or cold pixels relates to impulse noise reduction in color images. Impulse noise has a discrete distribution consisting of a small number of very narrow peaks. Salt and pepper noise is a typical example, and its effect on images is similar to the presence of hot and cold pixels.

Many of the published techniques replace the presumed noise pixel with a representative of a local patch obtained by rank ordering the color vectors within the patch. For example, the vector median filter described in Vector Median Filters, J. Astola, P. Haavisto, Y. Neuvoto, Proc. IEEE, 78, 1990, generalizes the concept of median from scalars to vectors.

In general, these approaches, while performing well on noise pixels, tend to have large false positive rates and, as a result, destroy image structure. In addition, the fact that most published studies were performed on small image sets in which the impulse noise was synthetically introduced makes it difficult to assess their relevance to the problem of hot cold pixels in digital cameras.

A recently published method for impulsive noise reduction in color images has been implemented as described in "New filtering technique for the impulsive noise reduction in color images," B. Smolka, A. Chydzinski, K. Plataniotis, A. Venetsanopoulos, Mathematical Problems in Engineering, 2004, 2004. The idea of this algorithm is to replace the central pixel of a 3×3 patch with the patch pixel that maximizes the sum of colorspace similarities to the other patch pixels, if different from the center pixel. Applying the algorithm to test images resulted in large false positive rates with considerable loss of detail.

BRIEF DESCRIPTION

According to one aspect of the present invention, a method is disclosed for identifying singleton outlier pixels in a selected color space in a digital image. An image pixel is a represented as a point in three dimensional RGB color space (the 2 spatial coordinates of the pixels are ignored). For each 3×3 patch of pixels in the image, the diameter of the 3×3 patch of pixels is determined The diameter of a set of pixels is the diameter of the minimal sphere that contains all the pixels of the set in the 3-dimensional RGB space. For each pixel in the patch, the Euclidean distance to its nearest neighbor pixel within the patch, as measured in the selected color space, is determined. The patch pixel that strictly minimizes (no ties are allowed) the distance to nearest neighbor is identified. Its minimum distance to nearest neighbor is compared with a threshold that is a preselected fraction of the diameter. If the threshold is exceeded, the pixel is identified as an outlier.

According to another aspect of the present invention, a method is disclosed for identifying pairs of adjacent outlier pixels in a selected color space. An image pixel is a represented as a point in three dimensional RGB color space (the 2 spatial coordinates of the pixels are ignored). For each 3×3 patch of pixels in the image, the minimum diameter of the 3×3 patch of pixels is calculated. For each pixel in the 3×3 patch, the distance to its nearest neighbor pixel within the 3×3 patch is computed, as measured in the selected color space. The computed distance from each pixel in the 3×3 patch to its nearest neighbor is compared with a threshold that is a preselected fraction of the minimum diameter. If the calculated distance to the nearest neighbor of a center pixel in the 3×3 patch is not both the largest distance to a nearest neighbor in the 3×3 patch and does not exceed the threshold, a set of comparisons is made of the computed distance from non-center pixels in the 3×3 patch to its nearest neighbor with a threshold that is a preselected fraction of the diameter, each comparison in the set being made by ignoring a different one of the non-center pixels in the 3×3 patch. If in only one of the comparisons in the set, the calculated distance from the center pixel to its nearest neighbor is the largest distance to a nearest neighbor and exceeds the threshold, a new 3×3 patch of pixels having the ignored pixel in the identified comparison as the new center pixel is defined. For each pixel in the new 3×3 patch, the distance to its nearest neighbor pixel within the new 3×3 patch is computed, as measured in the selected color space. The computed distance from each pixel in the new 3×3 patch to its nearest neighbor is compared with a threshold that is a preselected fraction of the minimum diameter. If the calculated distance from the new center pixel to its nearest neighbor in the new 3×3 patch of pixels is the largest distance to a nearest neighbor and exceeds the threshold, the center pixel and the new center pixel are identified as a pair of adjacent outlier pixels.

BRIEF DESCRIPTION OF THE DRAWING FIGURES

DETAILED DESCRIPTION

Figure 1:
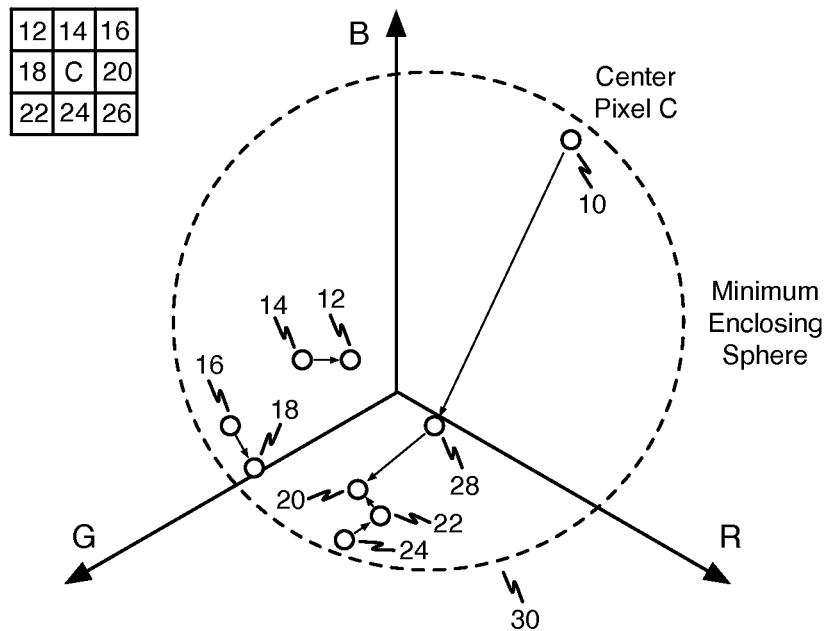
FIG. 1 is a diagram illustrating the characteristics of a simple case of a single pixel outlier in a 3×3 neighborhood of 9 pixels.

Persons of ordinary skill in the art will realize that the following description of the present invention is illustrative only and not in any way limiting. Other embodiments of the invention will readily suggest themselves to such skilled persons.

The approach of the present invention differs from the aforementioned published methods in that it focuses on reducing the false positive rate of pixel outlier detection. If false positives are reduced to a minimum, it turns out that the replacement method for the detected outlier is less important. While some replacement methods are superior to using a median filter, their additional computational cost is not justified as long as the false positive rate is low. If, on the other hand, a rudimentary detection method is used that allows the false positive rate to increase, then a more computationally complex replacement method becomes necessary.

Hot and cold defective pixels have incorrect, fixed, extreme values that do not represent the brightness of the scene. The present invention only addresses the cases where such pixels are either isolated (referred to herein as "singletons") or in pairs.

Such defective pixels can be easily detected if an image sequence of a changing scene is available since the hot and cold pixels will not change their value, or if the brightness of the scene is known. For example hot and cold pixels will stand out in an image of a uniform gray field. However, determining that a pixel has an incorrect value from one image alone is an ill-posed problem and certain assumptions about image statistics must be made.

Due to the blurring effect of an imaging lens, there are very few legitimate image features in which an isolated pixel is very different from its immediate neighbors. Such pixels are outliers of the local distribution of RGB values. An outlier is characterized by an RGB triplet that is very dissimilar to the RGB triplets of its eight surrounding neighbors. The techniques of the present invention involve identifying such outlier pixels.

For many pixel sensors, the hot pixels appear mostly in the blue channel. The red and green channels have very few hot pixel defects. The techniques of the present invention are capable of detecting hot pixels in any channel. According to the present invention, a hot pixel is defined as an outlier of the local distribution in RGB space. The techniques of the present invention can, however, be modified to detect hot pixels in a single color plane only.

A center pixel in a 3×3 neighborhood of pixels is a singleton, defined as a single outlier pixel surrounded by eight normal pixels. The vast majority of outliers are hot blue pixels, but persons of ordinary skill in the art will appreciate that cold pixels and other color pixels may be outliers as well.

According to a method of the present invention for detecting singleton outlier pixels, a sliding window examines 3×3 pixel patches or neighborhoods. The objective of the examination is to determine whether the center pixel of each patch is an outlier. The nine patch pixels are modeled as points in 3-dimensional RGB color space, ignoring their spatial coordinates. An outlier pixel is very dissimilar from its eight surrounding neighbors. According to the present invention, one dissimilarity metric is the squared Euclidean distance in RGB space. What is meant by very dissimilar will be made precise later.

Outlier pixels can be defined in camera color space or in sRGB space. It is preferred to detect outliers not in camera RGB but in sRGB color space; this is done for two reasons.

First, sRGB is the space where the images are viewed, and outliers have to be defined in the relevant (viewing) space. Faint hot pixels in camera RGB space tend to become strong outliers when mapped into sRGB. The ranking of the pixels in red, green, or blue is not invariant under a linear transformation (the color matrix).

Second, an outlier in camera RGB space is not necessarily an outlier in sRGB (and vice versa), because inter-pixel distances are radically changed by the application of the color matrix. Some color matrices have large off diagonal terms and therefore scaling of the spaces can be uneven.

Referring now to FIG. 1, a diagram illustrates the characteristics of a simple case of a single pixel outlier in a 3×3 pixel. The diagram of FIG. 1 is in 3-color space and shows the nearest neighbor relationship between the 9 pixels.

Each pixel in the 3×3 patch of pixels has a nearest neighbor in the color space plotted in FIG. 1 to which an arrow is pointing. For example, pixel 28 is the nearest neighbor of pixel 10, the center pixel. However, pixel 10 is not the nearest neighbor of pixel 28. In fact, pixel 10 is not the nearest neighbor of any pixel. The center pixel of the patch is an outlier: it has the longest distance to its nearest neighbor and is not anybody's nearest neighbor.

According to one aspect of the present invention, to determine whether the central pixel C of a 3×3 patch is to be labeled outlier, first, for each pixel i of nine pixels of the 3×3 patch, the distance to its nearest neighbor in the patch is determined. This distance may be the squared Euclidean distance $d_{nn}(i)$ to its nearest neighbor within the patch, as measured in sRGB space. The squared sRGB distance between pixels i and k is given by $$d_{ik} = (R_i - R_k)^2 + (G_i - G_k)2 + (B_i - B_k)^2.$$

Colorspace distance is a measure of pixel dissimilarity, and distance to the nearest neighbor is a measure of the degree of isolation of a pixel in a cloud of pixels. An outlier is an isolated pixel; it is far from the other pixels and in particular it is far from its nearest neighbor. The nearest neighbor relationship is not symmetric. Every pixel has a nearest neighbor, but not every pixel is the nearest neighbor of some pixel. Typically, an outlier is not the nearest neighbor of any neighboring pixel. Persons of ordinary skill in the art will note that the spatial coordinates of the pixels in the patch are not considered to compute the dissimilarity measure.

Using Matlab indexing, the central pixel of the 3×3 patch has an index of 5. Therefore, the first condition for the central pixel to be an outlier is to maximize the distance to nearest neighbor:

$$d_{nn}(5) > d_{nn}(i), i = 1,2,3,4,6,7,8,9. \quad \text{(Eq 1)}$$

Persons skilled in the art will appreciate that the pixels labeled in the example illustrated in FIG. 1 correspond to sequential index numbers in Matlab as follows:

| Index | Pixel Ref. No. |
|---|---|
| 1 | 12 |
| 2 | 14 |
| 3 | 16 |
| 4 | 18 |
| 5 | C |
| 6 | 20 |
| 7 | 22 |
| 8 | 24 |
| 9 | 26 |

Persons of ordinary skill in the art will observe that the inequality is strict and that no ties are allowed. The candidate outlier has to be at an absolute maximum of the distance to its nearest neighbor. This condition is necessary for eliminating the case where the central pixel is a mutual nearest neighbor relationship with another pixel (such points are called biroots of the nearest neighbor graph as described in "On Nearest Neighbor Graphs," D. Eppstein, M. Paterson and F. Yao, Discrete & Computational Geometry, 17, 1997) and both pixels are far from each other and from the other pixels. This condition indicates the possible presence of an outlier pair of pixels and has to be dealt with separately.

Figure 2:
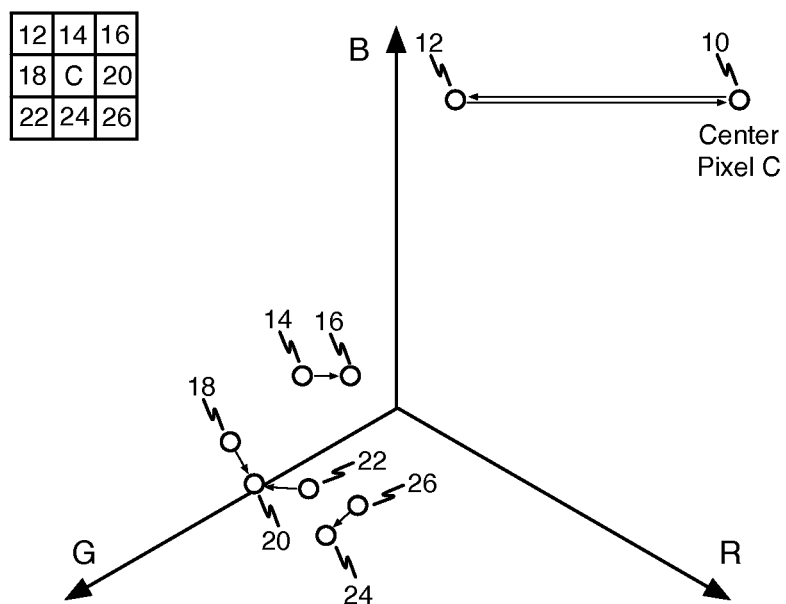
FIG. 2 is a diagram illustrating the characteristics of a case involving two outliers in a 3×3 neighborhood of 9 pixels.

Referring briefly now to FIG. 2, the outlier-pair phenomenon is illustrated. Center pixel C (reference numeral 10) is the nearest neighbor of pixel 12 and in turn pixel 12 is the nearest neighbor of center pixel C. These pixels are not nearest neighbors to any other pixels. Even though center pixel C and pixel 12 are nearest neighbors, both of them are far away from the other pixels in the 3×3 patch. The center pixel C maximizes the distance to its nearest neighbor but it is also the nearest neighbor of its nearest neighbor. Therefore pixel C is not a genuine singleton outlier. This may indicate the presence of a pair as will be disclosed herein.

Referring again to FIG. 1, in order for a center pixel C to be an outlier, the distance from pixel C to its nearest neighbor must also be large compared to other inter-pixel distances within the 3×3 patch. The diameter of the patch, as shown by dashed-line circle 30, is defined as the maximum of the pairwise distances (measured in sRGB space) among the pixels of the patch. Since there are 9 pixels, there are 9×8/2=36 inter-pixel distances. According to an aspect of the present invention, the distance from the center pixel C to its nearest neighbor must be a significant fraction of the set diameter $\phi$:

$$d_{nn}(5)/\phi \geq f, \qquad (Eq\ 2)$$

where $f \in [0, \ldots 1]$ is a user-specified fraction which defines how large the distance to nearest neighbor must be. This fraction is usually set to a value, such as 0.1. If the above conditions (Eq 1 and Eq 2) are satisfied, the central pixel of the current 3×3 patch is identified as an outlier.

The above conditions are satisfied by both hot and cold pixels in any color channel, but that in practice is an overly general condition, as the vast majority of outliers are hot blue pixels. According to the present invention, to only detect hot blue pixels it is required that the candidate outlier have a camera RGB blue value that is larger by a user-specified margin $\Delta$ than the maximum blue value of the neighboring eight pixels:

$$B_5 \geq B_i + \Delta,\ i \neq 5, \qquad (Eq\ 3)$$

If it is desired to detect cold blue pixels this condition is reversed.

Outliers (usually hot pixels) occur in pairs with a non-negligible frequency. The method disclosed above for detecting singleton outlier pixels cannot detect paired outliers. It may, however, be able to identify a singleton within a pair of outlier pixels.

Figure 3:
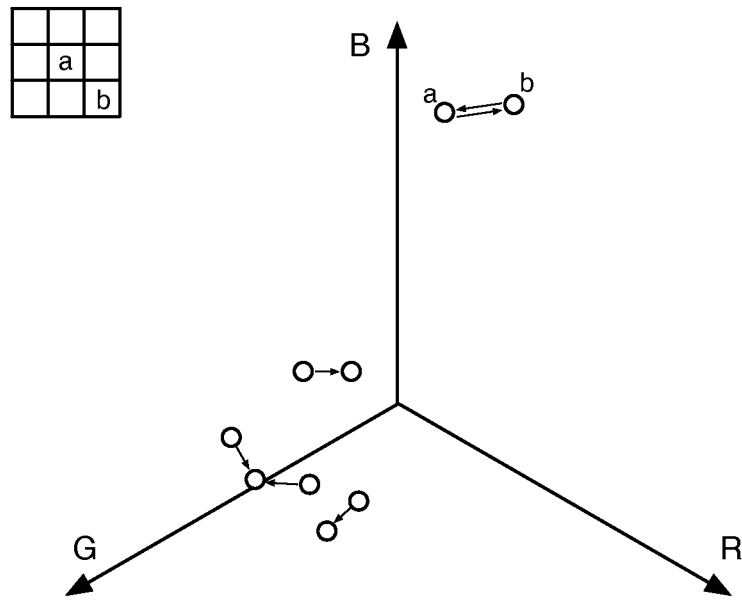
FIG. 3 is a diagram illustrating the characteristics of a case involving two similar neighboring pixel outliers in a 3×3 neighborhood of 9 pixels.

Referring now to FIG. 3, a diagram shows one possible condition wherein a pair of outlier pixels may not be detected using the method just described for detecting singleton outlier pixels. Consider the 3×3 patch of pixels centered on a hot pixel (a) and containing a second hot pixel (b) adjacent to pixel a in color space. The singlet detection algorithm may not identify pixel a as an outlier because, if pixels a and b are similar enough, pixel a would have a small distance to its nearest neighbor b. The center pixel a is not labeled outlier by the singleton detection algorithm because it is similar to neighboring outlier pixel b.

Figure 4:
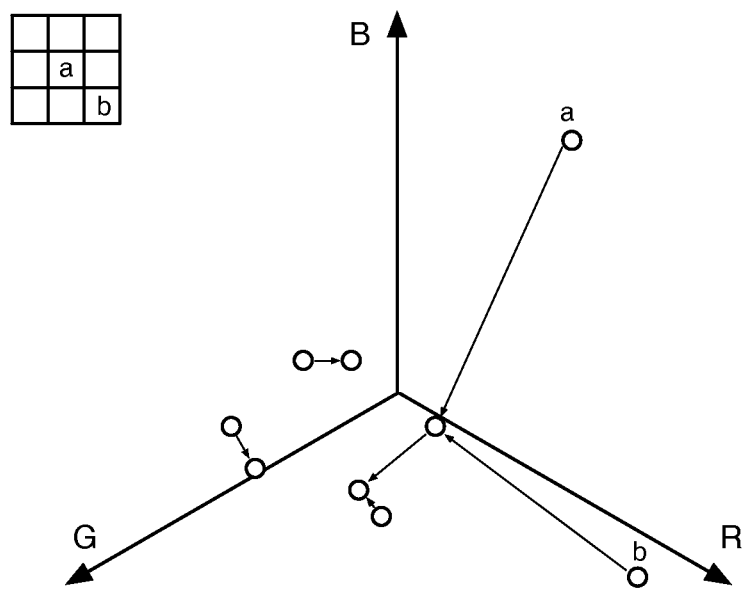
FIG. 4 is a diagram illustrating the characteristics of a case involving two dissimilar pixel outliers in a 3×3 neighborhood of 9 pixels.

Referring now to FIG. 4, a diagram shows another possible condition wherein a pair of outlier pixels may not be detected using the method just described for detecting singleton outlier pixels. Consider a 3×3 patch of pixels centered on an outlier pixel a and containing a second, "weaker" outlier pixel b adjacent to pixel a. In the example shown in FIG. 4, the two outlier pixels are dissimilar; in this case, one is hot and the other one cold. Using the singleton detection method just described, pixel a is identified as singleton because pixels a and b are not similar and pixel a is more distant to its nearest neighbor than pixel b However, at the 3×3 patch centered on pixel b, the singleton detection algorithm does not identify pixel b as an outlier because, in this new patch, pixel a is still the farthest to its nearest neighbor (pixel a is farther from its nearest neighbor than is pixel b).

According to another aspect of the present invention, outlier pairs such as the ones illustrated in FIGS. 3 and 4 may be detected. According to another aspect of the present invention, if pixel b was ignored, singleton detection applied to the remaining eight pixels of the patch would now identify pixel a as an outlier; the same reasoning applies to the 3×3 patch centered at pixel b.

Figure 5:
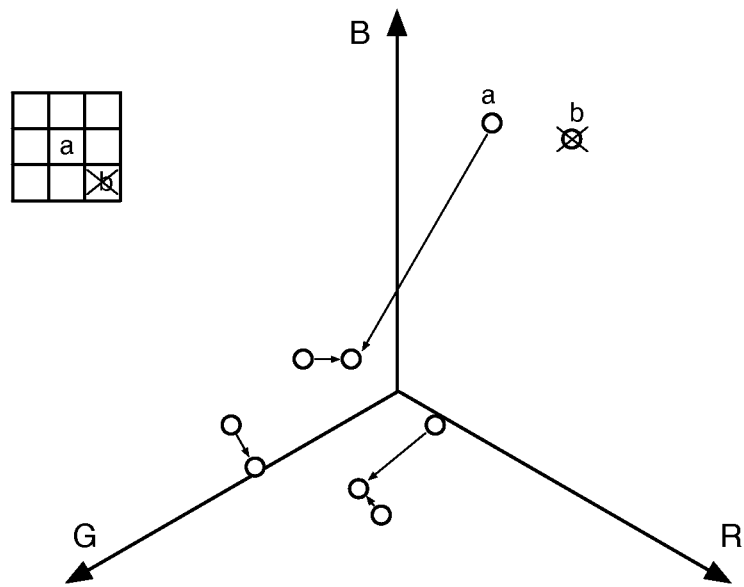
FIG. 5 is a diagram illustrating how ignoring a first pixel outlier in a pair of pixel outliers enables identification of a second pixel outlier in the pair as a singleton outlier.
Figure 6:
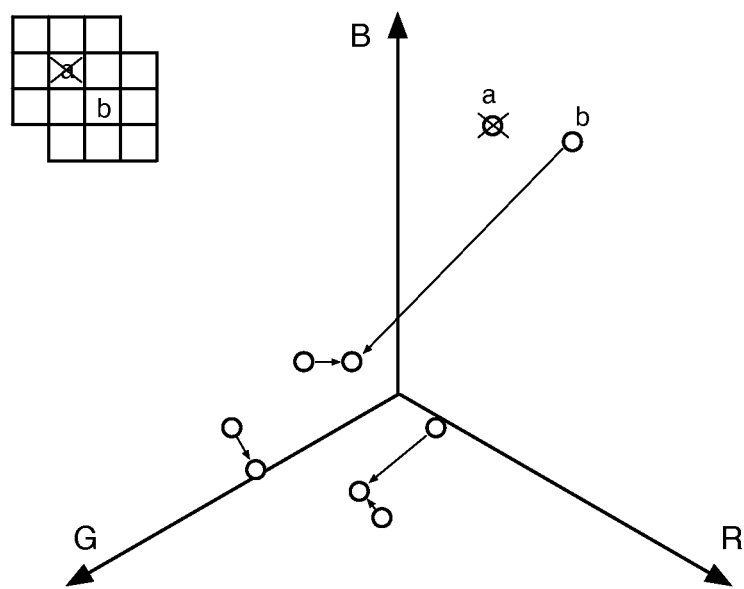
FIG. 6 is a diagram illustrating how ignoring a second pixel outlier in a pair of pixel outliers enables identification of a first pixel outlier in the pair as a singleton outlier.

More precisely, consider a 3×3 patch centered on pixel a where pixel a is not flagged as an outlier. As shown in FIGS. 5 and 6, pixel a may be a member of an outlier pair if two conditions are satisfied; first, if there exists one and only one pixel b neighboring pixel a such that by ignoring it and applying the singleton detection method to the remaining eight pixels of the patch identifies pixel a as a singleton, and second, and applying singlet detection to the 3×3 patch centered on pixel b does not flag pixel b as outlier due to the similarity of hot pixels a and b, but ignoring pixel a and applying the singleton detection method to the remaining eight pixels of the patch centered on pixel b identifies pixel b as a singleton.

It is instructive to emphasize the uniqueness and symmetry requirements of this aspect of the present invention: ignoring pixel a and only pixel a renders pixel b a singleton; and ignoring pixel b and only pixel b renders pixel a a singleton. Uniqueness and symmetry prevent "chaining" of three or more outlier detections (which would otherwise destroy large scale image structure) by enforcing the constraint that the pairs of outliers must be surrounded by normal pixels.

According to the present invention, there is a sequence of necessary conditions that must be met for adjacent pixels a and b to form an outlier pair. If any of these conditions are true, pixels a and b do not form an outlier pair. First, if pixel a does not satisfy the singleton criteria, it must be determined whether pixel a is a member of an outlier pair. Next, ignore each of the eight neighbors of pixel a in turn and re-apply the singleton test to pixel a.

If ignoring neighbor pixel b, and only pixel b, makes pixel a a singleton, next, consider the 3×3 patch centered at pixel b and apply the singleton test to pixel b. If pixel b is a singleton then the situation exists where singleton detection is detecting one member of an outlier pair as shown in FIGS. 5 and 6. Therefore, pixels a and b form an outlier pair. If pixel b is not a singleton, ignore each of the eight neighbors of pixel b in turn and re-apply the singleton test to pixel b. It is found that ignoring pixel a, and only pixel a, makes pixel b a singleton. Therefore, pixels a and b form an outlier pair.

Persons of ordinary skill in the art will note that pair detection requires the repeated application of singleton detection eight times for the patch centered at pixel a, and eight times for the patch centered at pixel b. An entire image may be processed by sliding the window over each 3×3 patch in the image and performing the method as described on that patch. Effects at the edges of the image where there are fewer than either three rows or three columns of pixels to process can be ignored.

Hot blue pixels present a special case. The vast majority of outliers (singletons and pairs) in some images are hot blue pixels. The algorithms presented above can be significantly sped up if it is restricted to detect only hot blue singletons and pairs.

Consider a 3×3 patch centered at pixel a. If it is desired only to detect hot blue singletons the patch would be further processed only if pixel a was its bluest pixel. However, since pairs are also being sought, the weaker requirement that the central pixel a and its neighboring outlier pixel b must have the top two largest blue values in the patch is imposed. Therefore the central pixel a has to be either the largest or the second largest blue-value pixel in the patch. This eliminates the need for a systematic search for pixel b in pair detection.

Next, (by one pixel at a time) a 3×3 window is slid across the image and at each location it is decided whether the current 3×3 patch must be further processed. The preconditions for processing a patch are: its blue range has to at least DELTA=10, the central pixel has to be the bluest or the second bluest in the patch, and the central pixel cannot be saturated (saturated pixels are properly dealt with in highlight neutralization).

The approach of the present invention differs from these published methods in that the effort is focused on reducing the false positive rate. If false positives are reduced to a minimum, it turns out that the replacement method for the detected outlier is less important. If, on the other hand, a rudimentary detection method is used and the false positive rate is allowed to increase, then the replacement method based on linear models becomes necessary.

The use of the nearest-neighbor relationship for the study of the distribution of the RGB triplets of the pixels of a patch is a non-parametric method and allows capture of the asymmetrical character of an outlier (i.e. not being the nearest neighbor of any pixel), something which is not possible when using conventional measures of centrality such as the vector median. The methods of the present invention rely on the rank order, and not on the precise numerical values, of inter-pixel distances, and is therefore more robust to noise. The nearest-neighbor relationship is non-parametric, and therefore does not require any assumptions that the data are drawn from a certain probability distribution. Many existing methods for outlier detection assume that the data are drawn from a Gaussian distribution. It has been found that the outliers depend strongly on the color matrix, because the rank order of distances (on which the nearest neighbor relationship is based) is changed by a linear transform (color matrix).

Having described the invention, it is noted that persons skilled in the art can make modifications and variations in light of the above teachings. It is therefore to be understood that changes may be made in the particular embodiments of the inventions disclosed, which are within the scope and spirit of the inventions as defined by appended claims.

What is claimed is:

1. In a digital image including a plurality of pixels, a method for identifying singleton outlier pixels in a selected color space comprising:
    for each 3×3 patch of pixels in the image, calculating the diameter of the 3×3 patch of pixels;
    for each pixel in the patch, computing the distance to its nearest neighbor pixel within the patch, as measured in the selected color space;
    comparing the computed distance from each pixel in the patch to its nearest neighbor with a threshold that is a preselected fraction of the diameter; and
    identifying a center pixel in the patch as an outlier pixel if its calculated distance to its nearest neighbor is the largest distance to a nearest neighbor and exceeds the threshold.

2. The method of claim 1 wherein the selected color space is sRGB space.

3. The method of claim 1 wherein the distance is the squared Euclidean distance.

4. The method of claim 1, wherein the preselected fraction of the diameter is about 0.1.

5. In a digital image including a plurality of pixels, a method for identifying pairs of adjacent outlier pixels in a selected color space comprising:
    for each 3×3 patch of pixels in the image, calculating the minimum diameter of the 3×3 patch of pixels;
    for each pixel in the 3×3 patch, computing the distance to its nearest neighbor pixel within the 3×3 patch, as measured in the selected color space;
    comparing the computed distance from each pixel in the 3×3 patch to its nearest neighbor with a threshold that is a preselected fraction of the minimum diameter;
    if the calculated distance to the nearest neighbor of a center pixel in the 3×3 patch is not both the largest distance to a nearest neighbor in the 3×3 patch and does not exceed the threshold, making a set of comparisons of the computed distance from non-center pixels in the 3×3 patch to its nearest neighbor with a threshold that is a preselected fraction of the diameter, each comparison in the set made by ignoring a different one of the non-center pixels in the 3×3 patch;
    if in only one of the comparisons in the set, the calculated distance from the center pixel to its nearest neighbor is the largest distance to a nearest neighbor and exceeds the threshold:
        define a new 3×3 patch of pixels having the ignored pixel in the identified comparison as the new center pixel;
        for each pixel in the new 3×3 patch, computing the distance to its nearest neighbor pixel within the new 3×3 patch, as measured in the selected color space;
        comparing the computed distance from each pixel in the new 3×3 patch to its nearest neighbor with a threshold that is a preselected fraction of the minimum diameter;
        if the calculated distance from the new center pixel to its nearest neighbor in the new 3×3 patch of pixels is the largest distance to a nearest neighbor and exceeds the threshold, identify the center pixel and the new center pixel as a pair of adjacent outlier pixels.

6. The method of claim 5 wherein the selected color space is sRGB space.

7. The method of claim 5 wherein the distance is the squared Euclidean distance.

8. The method of claim 5, wherein the preselected fraction of the minimum diameter is about 0.1.

* * * * *